Aug. 27, 1935.  E. E. HEWITT  2,012,717
RESERVOIR RELEASE VALVE
Filed June 30, 1931
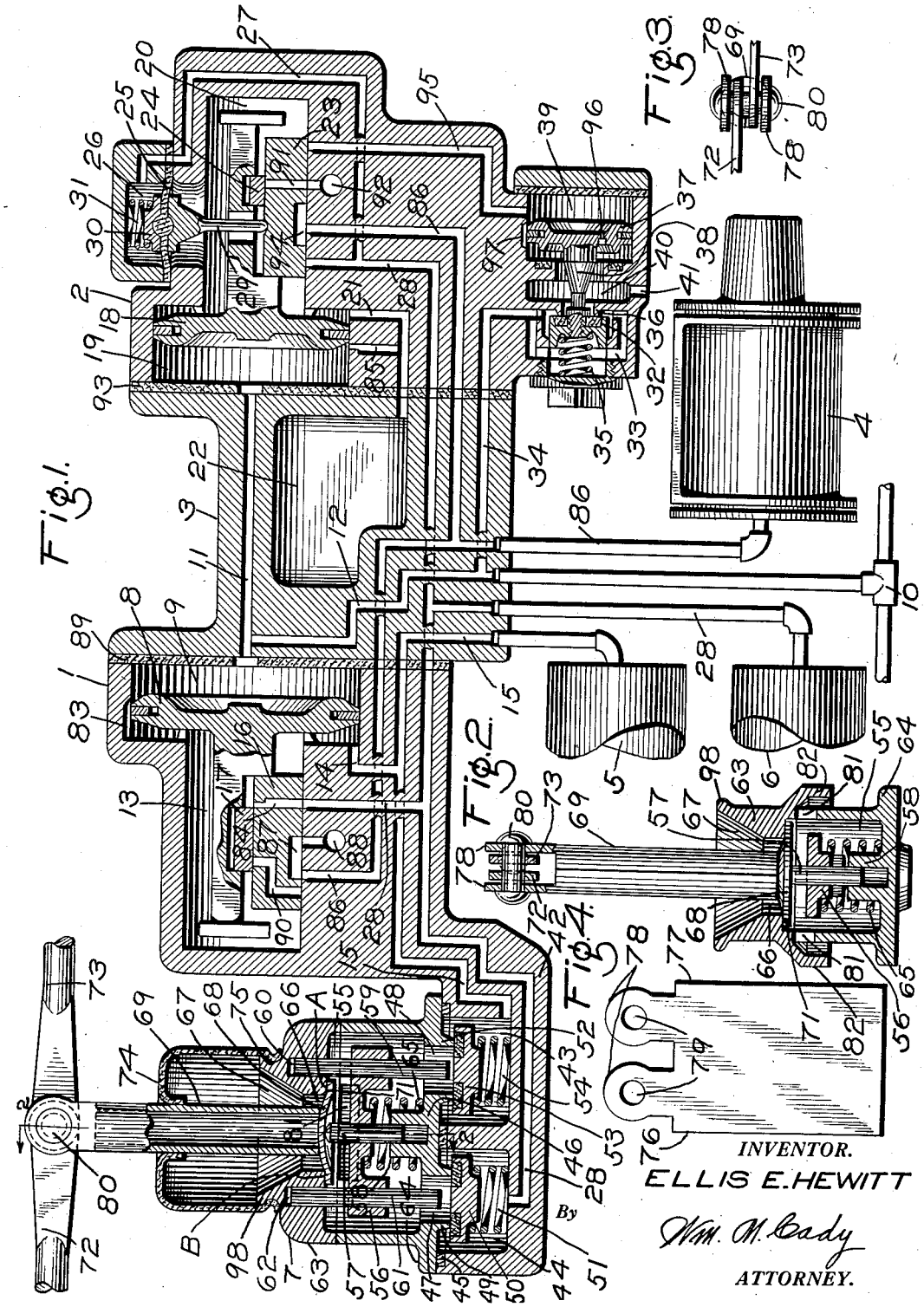
INVENTOR.
ELLIS E. HEWITT
By
Wm. N. Cady
ATTORNEY.

Patented Aug. 27, 1935

2,012,717

UNITED STATES PATENT OFFICE 2,012,717

RESERVOIR RELEASE VALVE

Ellis E. Hewitt, Edgewood, Pa., assignor to The Westinghouse Air Brake Company, Wilmerding, Pa., a corporation of Pennsylvania Application June 30, 1931, Serial No. 547,820

27 Claims. (Cl. 303—80)

This invention relates to fluid pressure brakes, and more particularly to the type operated in accordance with variations in pressure in a brake pipe.

In the usual brake equipment employed to control the brakes on a freight train, an auxiliary reservoir is carried by each car and the supply of fluid under pressure from the brake pipe to said reservoir and from said reservoir to the brake cylinder is controlled by a triple valve device which operates in accordance with variations in brake pipe pressure. Under certain conditions however, it is desired to reduce the pressure of fluid in the auxiliary reservoir independently of the triple valve device, and for this purpose an auxiliary reservoir release valve device is provided and is operated by a trainman from the side of a car by means of a connecting rod.

It has been proposed to provide a brake equipment for freight cars in which two reservoirs are provided on each car, and one object of my invention is to provide an improved reservoir release valve device which may be operated by a trainman for venting fluid under pressure from both of said reservoirs independently of the brake controlling valve device on the car.

Another object of my invention is to provide a reservoir release valve device of the above character having two venting positions, one position for venting fluid under pressure from one of said two reservoirs, and another position for simultaneously venting fluid under pressure from both of said reservoirs.

Other objects and advantages will appear in the following more detailed description of my invention.

In the accompanying drawing; Fig. 1 is a diagrammatic view, mainly in section, of a fluid pressure brake equipment having my improved reservoir release valve device associated therewith; Fig. 2 is a sectional view of the reservoir release valve device taken on the line 2—2 of Fig. 1; Fig. 3 is a plan view of the reservoir release valve operating stem showing the operating rods connected thereto; and Fig. 4 is a face view of the stamped blank from which the operating stem is formed.

As shown in Fig. 1 of the drawing, the fluid pressure brake equipment comprises a service application valve device 1, and an emergency application valve device 2 preferably mounted on oppositely disposed faces of a pipe bracket 3, a brake cylinder 4, an auxiliary reservoir 5, an emergency reservoir 6, and a reservoir release valve device 7.

The service application valve device 1 comprises a casing containing a piston 8 having a chamber 9 at one side open to a brake pipe 10 through passages 11 and 12, and a valve chamber 13 at the opposite side connected to the auxiliary reservoir 5 through passage 14 and passage and pipe 15. The valve chamber contains a main slide valve 16 and an auxiliary slide valve 17 adapted to be moved by the piston 8.

The emergency application valve device 2 comprises a casing containing an emergency piston 18 having a chamber 19 at one side open to the brake pipe 10 through passage 11 and passage 12 and having at the opposite side a valve chamber 20 connected by a passage 21 to a quick action chamber 22. Contained in the valve chamber 20 is a main slide valve 23 and an auxiliary slide valve 24 adapted to be moved by the piston 18.

The emergency application valve further comprises a flexible diaphragm 25 open at one side to valve chamber 20 and at the opposite side to a chamber 26 which is connected by a passage 27 and a passage and pipe 28 to the emergency reservoir 6. Interposed between said diaphragm and the main slide valve 23 is a pin 29 having rocking engagement with said slide valve and having an enlarged head portion engaging the diaphragm. A spring follower 30 is pressed into engagement with the opposite side of the diaphragm by means of a spring 31.

Associated with the emergency valve device is a vent valve device comprising a vent valve 32 contained in a chamber 33 which is open to brake pipe 10 through passage 34 and pipe 12. Said chamber also contains a spring 35 for urging said vent valve into engagement with a seat rib 36. A piston 37 is connected by a stem 38 to the vent valve 32 and has at one side a chamber 39, the opposite side of said piston being open to the atmosphere through chamber 40 and an atmospheric passage 41.

Preferably extending from the casing of the service application valve device 1 is a bracket 42 upon which is mounted the reservoir release valve device 7, said bracket being provided with a valve cavity 43 connected to passage 15 from the auxiliary reservoir 5, and another cavity 44 connected to passage 28 from the emergency reservoir 6.

Mounted on the bracket 42 is the reservoir release valve device 7 which comprises a body 64 having a chamber 55, the lower end of which is closed by a partition wall 46, and a cover 63 mounted on the body 64. A gasket 45 is provided between the body 64 and bracket 42 for effecting a leak-proof seal.

The partition wall 46 has two through vent passages 47 and 48. The outer end of the vent passage 47 is provided with a seat rib 49 adapted to be engaged by an emergency reservoir release valve 50 which is disposed in the cavity 44 and normally pressed into engagement with the seat rib 49 by means of a spring 51. The outer end of the vent passage 48 is provided with a seat rib 52 and an auxiliary reservoir release valve 53, which is contained in cavity 43, is normally pressed into engagement with said seat rib by means of a spring 54.

Disposed in chamber 55 at one side of the partition wall 46 is a cross-head 56 carried by and secured to a guide pin 57, one end of which is slidably mounted in a bore in a boss 58 projecting from the partition wall 46. Carried in one end of the cross-head 56 is a pin 59, one end of which slidably extends into a bore 60 of the cover 63 and the other end projects toward the auxiliary reservoir release valve 53 but does not normally engage said valve. A similar pin 61 is carried by the other end of the cross-head 56. The pin 61 has one end slidably extending into a bore 62 in the cover and the other end projects toward but does not normally engage the emergency reservoir release valve 50. The cross-head 56 and valve operating pins 59 and 61 are normally maintained in the position shown in the drawing by a spring 65 and in this position the distance between the end of pin 59 and the auxiliary reservoir release valve 53 is less than the distance between the pin 61 and the emergency reservoir release valve 50.

The cover 63 is provided with a bore 66, the upper end of which terminates into a conical shaped opening 67. Extending through the opening 67 and bore 66 and into chamber 55 is a manually operated device for moving the cross-head 56 against the pressure of spring 65.

The manually operated device comprises a circular disk-like member 68, preferably dished and having a rim or flange of larger diameter than that of opening 66, and said member is normally pressed into engagement with surface 71 of the cover 63 by spring 65 acting through the cross-head 56 and cross-head guide pin 57. A hollow operating stem 69 is preferably welded to one side of the member 68 for tilting said member on the surface 71. By dishing the member 68, the point of engagement with the pin 57 is in line with surface 71 so as to reduce to a minimum the sideward movement of said pin when operated by the tilting of the member 68.

Secured to the upper end of the operating stem 69 are operating rods 72 and 73, extending in opposite directions, one to each of the two sides of a car, so that a trainman can operate the release valve device from either side of the car. If the rod 72 is pulled by an operator or if the rod 73 is pushed by an operator, the top of the operating stem 69 is moved toward the left and this turns the member 68 counterclockwise about a pivot formed at A on the surface 71 of cover 63. If the rod 72 or rod 73 is moved in the reverse direction, the member 68 fulcrums at B on the surface 71. Irrespective of the direction of movement of the operating stem 69, the member 68 fulcrums at some point on the surface 71 and causes a movement of the cross-head operating pin 57 and cross-head 56 against the pressure of spring 65, and the conical shaped opening 67 is provided to permit such movement.

The operating stem 69 is preferably stamped from sheet material, the developed form being shown in Fig. 4. The stamping is bent to the form of a tube and the butting edges 76 and 77 are welded and to this tube is welded the member 68, which also is preferably a stamping. As shown in Fig. 4, the stamping includes two lugs 78 each with a hole 79, so that when the stem is formed up, the holes 79 are in alinement to receive a pin or rivet 80 to which is connected the operating rods 72 and 73.

As shown in Fig. 2 of the drawing, a plurality of notches 81 are formed in the side wall of the body 64 through which the chamber 55 is open to the atmosphere, and each of these notches is baffled or partly covered with a shroud or extension 82 from the cover portion 63, in order to prevent foreign matter from entering chamber 55.

A flexible boot 74, preferably constructed of a rubber composition is employed to prevent entrance of dirt or other foreign matter into the conical shaped opening 67 and on to the member 68, so that the operation of said member will not be interfered with. The boot 74 is provided at its open end with an annular bead 75 adapted to clamp over a bead 98 of the cover 63, and the other end of the boot is provided with an opening through which the operating stem 69 is inserted.

In operation, fluid under pressure is supplied to brake pipe 10 in the usual manner and from the brake pipe flows through passages 12 and 11 to piston chambers 9 and 19. With the service application valve piston 8 in the release position shown in the drawing, fluid under pressure flows from chamber 9 through feed groove 83 to valve chamber 13 and from thence through passage 14 and passage and pipe 15 to the auxiliary reservoir 5 and to valve chamber 43 of the reservoir release valve device 7. Fluid under pressure also flows from valve chamber 13 through port 84 in the main slide valve 16 and passage and pipe 28 to the emergency reservoir 6 and valve chamber 44 of the reservoir release valve device 7.

With the emergency application valve piston 18 in the release position, fluid under pressure flows from chamber 19 through passage 85 to the quick action chamber 22 and the valve chamber 20. In this release position the emergency reservoir passage 28 is lapped and fluid under pressure from the emergency reservoir 6 flows through passages 28 and 27 to the loading diaphragm chamber 26.

With the slide valve 16 of the service application valve device in the release position, the brake cylinder 4 is open to the atmosphere through pipe and passage 86, cavity 87 in the main slide valve 16 and an atmospheric passage 88.

With the brake equipment charged to brake pipe pressure, if it is desired to effect a service application of the brakes, fluid under pressure is gradually vented from brake pipe 10 and the connected piston chambers 9 and 19 at a service rate.

The service rate of reduction in the piston chamber 9 of the service application valve device permits auxiliary reservoir pressure in valve chamber 13 to shift the piston 8 and slide valves 16 and 17 to the service position in which said piston engages a gasket 89. In this position, the service port 90 in the main slide valve is uncovered by the auxiliary valve 17 and said port registers with the brake cylinder passage 86. This permits fluid under pressure to flow from the auxiliary reservoir 5 through pipe and passage 15, passage 14, valve chamber 13, port 90 and passage and pipe 86 to the brake cylinder 4 and effect an application of the brakes.

The service rate of reduction in the emergency piston chamber 19 permits quick action chamber pressure in valve chamber 20 to shift the piston 18 and auxiliary slide valve 24 outwardly, thereby uncovering port 91 through the main valve 23, which port registers with an atmospheric passage 92. This permits fluid under pressure to flow from the quick action chamber 22 through passage 21 and valve chamber 20 to the atmosphere at such a rate as to prevent an increase in the pressure differential on the piston 18 sufficient for it to move the main slide valve 23.

If a sudden reduction in pressure is effected in the brake pipe 10 and the piston chambers 9 and 19, the service application valve device 1 operates in the same manner as in effecting a service application of the brakes to supply fluid under pressure to the brake cylinder 4. The venting capacity of the port 91 in the main emergency slide valve 23 is however insufficient to reduce the pressure in valve chamber 20 as rapidly as the brake pipe pressure is reduced in chamber 19. Consequently, a pressure differential is obtained on the emergency piston 18 sufficient to move said piston and the slide valves 23 and 24 to emergency position, in which the piston engages a gasket 93.

In emergency position of the emergency slide valve 23, a cavity 94 in said slide valve connects passage 28 from the emergency reservoir 6 to the brake cylinder passage 86, so that fluid under pressure flows from the emergency reservoir 6 to the brake cylinder 4 and equalizes in the brake cylinder with fluid from the auxiliary reservoir 5 as supplied through the service application valve device 1, thereby producing a high emergency brake cylinder pressure.

With the main emergency slide valve 23 in emergency position, fluid under pressure is vented from the valve chamber 20 and the connected quick action chamber 22 through passage 95 to the vent valve piston chamber 39. The piston 37 is thereby operated to unseat the vent valve 32 so as to locally vent fluid under pressure from the brake pipe 10 through pipe and passage 12, passage 34, vent valve chamber 33, past the vent valve 32 to chamber 40 and thence to the atmosphere through passage 41, this local quick venting of fluid from the brake pipe being adapted to transmit emergency action serially through a train in the usual manner.

Fluid under pressure supplied to vent valve piston chamber 39 flows through a restricted port 96 in piston 37 to chamber 40 leading to the atmosphere, and when the pressure of fluid in chamber 39 becomes thus reduced to below the resisting pressure of spring 35, said spring seats the vent valve 32 and moves the piston 37 to its normal position, in which a by-pass groove 97 is opened to the opposite sides of the piston and through this by-pass groove and the passage 95 fluid under pressure continues to flow from the emergency valve chamber 20.

Fluid at brake cylinder pressure in cavity 94 of the main emergency slide valve 23 tends to lift said slide valve from its seat upon venting of fluid from valve chamber 20, but this is prevented by emergency reservoir pressure in chamber 26 acting on diaphragm 25 which exerts a seating pressure on said slide valve through the rocking pin 29, which pressure is of sufficient degree to hold the slide valve 23 seated.

To effect a release of the brakes after an application, fluid under pressure is supplied to the brake pipe and from thence to the piston chambers 9 and 19. The pistons 8 and 18 and their respective slide valves are thereby moved to release position, in which the auxiliary reservoir 5 and emergency reservoir 6 are recharged and the brake cylinder 4 is opened to the atmosphere so as to vent fluid under pressure from the brake cylinder, in the same manner as in initially charging the brake equipment as hereinbefore described.

In effecting the release of brakes on a long train, it is customary to first turn the brake valve device to release position so as to supply fluid at high pressure directly from the main reservoir to the brake pipe, and then after a certain lapse of time the brake valve device is turned from the release position to running position, in which fluid supplied to the brake pipe is at the pressure normally carried.

Due to the resistance to flow of fluid under pressure through the brake pipe, the initial high pressure is obtained only in the front portion of the train and is adapted to increase the rate of flow toward the rear of the train so as to hasten the release of the brakes.

At the front end of the train, fluid at the high brake pipe pressure flows from the service application valve piston chamber 9 through feed groove 83 to valve chamber 13 and the auxiliary reservoir 5. Now, if the brake valve device is held in the release position for too long a period of time, there is a possibility that the pressure in valve chamber 13 will become greater than that normally carried, so that when the brake valve device is turned to running position and the brake pipe pressure reduces to or below that normally carried, the higher pressure in valve chamber 13 will move the piston 8 and slide valves 16 and 17 to service position and causes an undesired application of the brakes.

In order to release the brakes after such an undesired application, the reservoir release valve device 7 is operated. The operating stem 69 is moved by means of the pull rod 72 or 73 and causes the member 68 to fulcrum on the surface 71 and move the stem 57 and cross-head 56 in a downwardly direction against the pressure of spring 65. The operating pin 59 engages the auxiliary reservoir release valve 53 and further downward movement unseats said valve from the seat rib 52, thereby permitting fluid under pressure to flow from the valve chamber 13 and auxiliary reservoir 5 through passages 14 and 15, chamber 43, past the valve 53 to chamber 55 and from thence through the notches 81 to the atmosphere. The release valve 53 is thus maintained open until the pressure in valve chamber 13 is reduced sufficiently below the brake pipe pressure in piston chamber 9, as to permit the brake pipe pressure to move the piston 8 and slide valves 16 and 17 to release position and connect the brake cylinder 4 to the atmosphere so as to effect a release of the brakes. When fluid starts to vent from the brake cylinder in releasing, the operator permits the operating stem 69 to be returned to its normal position by the action of spring 65 which also moves the cross-head pin 59 out of engagement with the valve 53, thereby permitting spring 54 to seat said valve. The valve chamber 13 and auxiliary reservoir 5 then charge up to the brake pipe pressure carried.

It will be noted that greater clearance is provided between the end of the operating pin 61 and the emergency reservoir release valve 50 than is provided between pin 59 and the auxiliary reservoir release valve 53. As a result, it is possible for the auxiliary reservoir release valve 53 to be unseated for effecting the above described operation without unseating the emergency reservoir release valve 50.

In switching cars out of a train it is customary for the engineer to effect an emergency application of the brakes on the train before detaching the locomotive from the train. This is generally effected on the verge of a descending grade or what is commonly known as a "hump" so that with the brakes on a car released, the car will freely move by itself. After the engine is detached from the train, it is necessary to vent fluid under pressure from the brake system on each car in order to release the emergency application of brakes on the car before the car will freely move as desired. This is accomplished by the trainman operating the reservoir release valve device 7. However, instead of moving the stem 69 only sufficient to unseat the auxiliary reservoir release valve 53, it is moved a greater distance so as to unseat the emergency reservoir release valve 50 as well as the auxiliary reservoir release valve 53. This vents fluid under pressure from the emergency reservoir 6, through pipe and passage 28, valve chamber 44, and past the valve 50 to chamber 55, which is open to the atmosphere through the notches 81, at the same time as fluid under pressure is vented from the auxiliary reservoir 5 through pipe and passage 15, valve chamber 43, past the valve 53 and through chamber 55 and notches 81.

As hereinbefore described in connection with effecting an emergency application of the brakes, the auxiliary reservoir 5 is connected to the brake cylinder 4 through the service application valve device 1, and the emergency reservoir 6 is connected to the brake cylinder 4 through the emergency application valve device 2. Consequently, as fluid under pressure is vented from said reservoirs, it is also vented from the brake cylinder 4 and a release of the brakes is effected, after which the car can freely move on the descending grade as desired.

It is desirable to thus vent fluid under pressure from both of said reservoirs for the reason that emergency reservoir pressure acts in passage 28 and brake cylinder pressure acts in passage 86 below the main slide valve 16 of the service application valve device 1 when in emergency position, and even though emergency reservoir 6 is connected to the brake cylinder as well as the auxiliary reservoir when the brake controlling valve device is in emergency position, there would be a tendency for emergency reservoir pressure and brake cylinder pressure to lift the slide valve 16 from its seat if fluid under pressure were only vented from the auxiliary reservoir 5 and the connected valve chamber 13. This would be undesirable in that dirt or other foreign matter might get on the seat of the slide valve 16 and cause said slide valve and its seat to become scored, which would result later in leakage and possible failure of the device to properly function.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a plurality of reservoirs normally charged with fluid under pressure and from which fluid under pressure is adapted to be supplied to effect an application of the brakes, and a plurality of release valves adapted to vent fluid under pressure from said reservoirs, of means separate from and movable independently of said valves for unseating said valves, a cross-head carrying said means, and manually operated means for moving said cross-head.

2. In a fluid pressure brake equipment, the combination with a plurality of reservoirs normally charged with fluid under pressure and from which fluid under pressure is adapted to be supplied to effect an application of the brakes, and a plurality of release valves adapted to vent fluid under pressure from said reservoirs, of means separate from and movable independently of said valves for successively opening said valves, a cross-head carrying said means, and a manually controlled lever for moving said means.

3. In a fluid pressure brake equipment, the combination with a casing, of an auxiliary reservoir and an emergency reservoir connected to said casing and normally charged with fluid under pressure, a pair of release valves disposed in said casing, one of said release valves adapted to vent fluid under pressure from said auxiliary reservoir and the other of said release valves adapted to vent fluid under pressure from said emergency reservoir, means separate from and movable independently of said valves and slidably mounted in the casing for opening said release valves for venting fluid under pressure from said reservoirs, a cross-head carrying said means, and a manually operated lever for operating said means.

4. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, means separate from and movable independently of said valves and slidably mounted in the casing for opening said release valves, a cross-head for operating said means, and a manually operated lever for operating said cross-head.

5. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, a pin for operating each release valve, a cross-head movable relative to said release valves and carrying the valve operating pins, and a manually operated lever for operating said cross-head.

6. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, a pin for operating each release valve and slidably mounted in the casing, a cross-head movable relative to said release valves and carrying the valve operating pins, and a manually operated lever for operating said cross-head.

7. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, a pin for operating each release valve, a cross-head movable relative to said release valves and carrying the valve operating pins, a guide carrying said cross-head and slidably mounted in the casing, and a manually operated lever for moving said guide.

8. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, a pin for operating each release valve and slidably mounted in the casing, a cross-head carrying the valve operating pins, a guide carrying said cross-head and slidably mounted in the casing, a manually operated lever for moving said guide to open said release valves, and a spring for moving said cross-head to permit said release valves to seat.

9. In a fluid pressure brake equipment, the combination with a plurality of reservoirs normally charged with fluid under pressure and from which fluid under pressure is adapted to be supplied to effect an application of the brakes, and a casing to which said reservoirs are connected, of a plurality of release valves disposed in said casing and adapted to vent fluid under pressure from said reservoirs, an operating pin for unseating one of said valves, an operating pin for unseating the other of said valves at a different time, a cross-head movable relative to said valves and carrying said pins and a manually operated lever for operating said cross-head.

10. In a fluid pressure brake, the combination with a brake controlling valve device and a plurality of reservoirs connected to said brake controlling valve device and normally charged with fluid under pressure, of valve means for each of said reservoirs operative independently of each other for venting fluid under pressure from said reservoirs, and manual means for operating separately one of said valve means or simultaneously operating both of said valve means.

11. In a fluid pressure brake, the combination with a brake controlling valve device and a plurality of reservoirs connected to said brake controlling valve device and normally charged with fluid under pressure, of a release valve device for each of said reservoirs operative to vent fluid under pressure therefrom, and a manually operated member for operating the reservoir release valve devices.

12. In a fluid pressure brake, the combination with a brake controlling valve device and a plurality of reservoirs connected to said brake controlling valve device and normally charged with fluid under pressure, of a release valve device for each of said reservoirs operative to vent fluid under pressure therefrom, and a manually operated member for operating the reservoir release valve devices to successively vent fluid under pressure from one of said reservoirs and then from another of said reservoirs.

13. In a fluid pressure brake, the combination with a brake controlling valve device and a plurality of reservoirs connected to said brake controlling valve device and normally charged with fluid under pressure, of a release valve device for each of said reservoirs operative to vent fluid under pressure therefrom, and a manually operated member movable to a certain position to effect the operation of one of said release valve devices and upon a further movement to effect the operation of another of said release valve devices.

14. In a fluid pressure brake, the combination with a brake controlling valve device and a plurality of reservoirs connected to said brake controlling valve device and normally charged with fluid under pressure, of a release valve device for each of said reservoirs operative to vent fluid under pressure therefrom, and a manually operated member movable to a certain position to effect the operation of one of said release valve devices and upon a further movement to effect the operation of all of said release valve devices.

15. The combination with an automatic air brake mechanism, including a plurality of reservoirs, of valve means, including a plurality of valves, controlling vents from each of said reservoirs to the atmosphere; and common means for mechanically actuating said valve means to vent one of said reservoirs and then to vent another of said reservoirs.

16. The combination with an automatic air brake mechanism, including a normally charged brake pipe, a brake cylinder and a plurality of reservoirs, of venting means for the brake cylinder; valve means controlling vents to the atmosphere leading from each of said reservoirs and adapted, through actuation thereof, to effect operation of the brake cylinder venting means, said valve means being movable between three positions, namely, a normal, closed position, a second position in which one of the reservoir vents is open, and a third position in which both reservoir vents are open; and means for actuating the valve means.

17. The combination with an automatic air brake mechanism, including a brake cylinder and a plurality of reservoirs, of venting means for the brake cylinder; valve means controlling vents to the atmosphere leading from each of said reservoirs; and means for actuating said valve means, the valve means being adapted, as a result of operation of the valve actuating means, to effect operation of the brake cylinder venting means, said valve means being movable between three positions, namely, a normal, closed position, a second position in which one of the reservoir vents is open, and a third position in which both reservoir vents are open.

18. The combination with an automatic air brake mechanism, including a brake cylinder, an auxiliary reservoir and a supplemental reservoir, of venting means for the brake cylinder; valve means controlling vents to the atmosphere leading from each of said reservoirs, and means for actuating said valve means, the valve means being adapted, as a result of operation of the valve actuating means, to effect operation of the brake cylinder venting means, said valve means being movable between three positions, namely, a normal, closed position, a second position in which venting of the auxiliary reservoir and the brake cylinder is effected, and a third position in which venting of the brake cylinder and both the auxiliary and supplemental reservoirs is effected.

19. The combination with an automatic air brake mechanism, including a brake cylinder and a plurality of reservoirs, of venting means for the brake cylinder; valve means controlling vents to the atmosphere leading from each of said reservoirs, said valve means comprising poppet valves corresponding to said reservoir vents and resilient means normally holding said valves closed; and means for actuating said valve means, the valve means being adapted, as a result of operation of the valve actuating means, to effect operation of the brake cylinder venting means, said valve means being movable between three positions, namely, a normal, closed position, a second position in which one of the reservoir vents is open, and a third position in which both reservoir vents are open.

20. In a fluid pressure brake equipment, in combination, a brake pipe, a brake cylinder, a plurality of reservoirs normally charged with fluid under pressure, automatic valve means movable upon an emergency reduction in brake pipe pressure to an emergency position for establishing communication between said reservoirs and brake cylinder for effecting an emergency application of the brakes, valve means for controlling separate vents from said reservoirs and operative to vent said reservoirs and thereby said brake cylinder when said automatic valve means is in said emergency position, and common means operable manually for effecting the operation of said valve means.

21. In a fluid pressure brake equipment, in combination, a brake pipe, a brake cylinder, a plurality of reservoirs normally charged with fluid under pressure, automatic valve means movable upon an emergency reduction in brake pipe pressure to an emergency position for establishing communication between said reservoirs and brake cylinder for effecting an emergency application of the brakes, said automatic valve means being movable upon an increase in brake pipe pressure to a release position for effecting a release of fluid under pressure from said brake cylinder, a plurality of valves controlling separate vents from said reservoirs and operative to vent said reservoirs and thereby said brake cylinder when said automatic valve means is in said emergency position, and common means operable manually for effecting the operation of said manually operative valve means.

22. In a fluid pressure equipment, in combination, a brake pipe, a brake cylinder, an auxiliary reservoir, an emergency reservoir, automatic valve means movable upon a service reduction in brake pipe pressure to a service position for supplying fluid under pressure from said auxiliary reservoir to said brake cylinder and movable upon an emergency reduction in brake pipe pressure to a position for supplying fluid under pressure from both of said reservoirs to said brake cylinder, and movable when the brake pipe pressure exceeds the pressure in said auxiliary reservoir to a release position for effecting a release of fluid under pressure from said brake cylinder, valve means for controlling separate vents from said reservoirs, said valve means having one position for venting both of said reservoirs and said brake cylinder when said valve means is in said emergency position, and having another position for venting only said auxiliary reservoir for effecting movement of said valve means to release position after a service reduction in brake pipe pressure, and a member for manually operating said valve means.

23. In a fluid pressure brake equipment, in combination, a brake pipe, a brake cylinder, a plurality of reservoirs normally charged with fluid under pressure, automatic valve means movable upon an emergency reduction in brake pipe pressure for establishing communication between said reservoirs and the brake cylinder for effecting an emergency application of the brakes and adapted to maintain said communication until the brake pipe pressure is increased, and manually operable valve means for venting fluid from said reservoirs and thereby from said brake cylinder following operation of said automatic valve means to effect an emergency application of the brakes.

24. In a fluid pressure brake equipment, in combination, a brake pipe, a brake cylinder, a plurality of reservoirs normally charged with fluid under pressure, automatic valve means comprising a service valve device and an emergency valve device, each movable upon an emergency reduction in brake pipe pressure for establishing communications through which fluid under pressure is supplied from said reservoirs to the brake cylinder and adapted to maintain said communications unless the brake pipe pressure is increased, and manually operable valve means for venting fluid from said reservoirs and thereby from the brake cylinder with said valve devices in position to establish said communications.

25. In a fluid pressure brake, the combination with a brake pipe, a brake cylinder, a plurality of reservoirs normally charged with fluid under pressure, and a brake controlling valve operated upon variations in brake pipe pressure to supply fluid under pressure from one of said reservoirs to said brake cylinder and subjected to fluid under pressure supplied from the other of said reservoirs acting on the valve seat face of the valve tending to lift the valve from its seat and to fluid under pressure supplied from said one of said reservoirs and acting on its opposite face and tending to retain said valve upon its seat against the fluid pressure tending to lift it from its seat, of means for insuring simultaneous draining of fluid from said reservoirs whereby the said reservoirs are simultaneously drained so as to prevent such differences in fluid pressure acting on said valve, while the reservoirs are being drained, as would cause lifting of said valve from its seat.

26. In a fluid pressure brake, the combination with a brake pipe, a brake cylinder, a reservoir normally charged with fluid under pressure and a brake controlling valve operated upon variations in brake pipe pressure to supply fluid under pressure from said reservoir to said brake cylinder and subjected to fluid under pressure from said brake cylinder acting on the valve seat face of the valve tending to lift it from its seat and to fluid under pressure supplied from said reservoir and acting on its opposite face and tending to retain said valve upon its seat, of means for insuring the simultaneous draining of fluid from said reservoir and said brake cylinder whereby the said reservoir and said brake cylinder are simultaneously drained so as to prevent such differences in pressure acting on said valve while said reservoir and said brake cylinder are being drained as would cause lifting of said valve from its seat.

27. In a fluid pressure brake apparatus, the combination with a brake controlling valve device having a plurality of reservoirs normally charged with fluid under pressure, of a manually operable valve device having means adapted when in one position to vent fluid under pressure from one reservoir only, and when in another position to vent fluid under pressure concurrently from all said reservoirs.

ELLIS E. HEWITT.